US007984444B1

(12) United States Patent
Shavit et al.

(10) Patent No.: US 7,984,444 B1
(45) Date of Patent: Jul. 19, 2011

(54) COMPOSITE ABORTABLE LOCKS

(75) Inventors: Nir N. Shavit, Cambridge, MA (US);
Mark S. Moir, Hampton, NH (US);
Virendra J. Marathe, Rochester, NY (US)

(73) Assignee: Oracle America, Inc., Redwood City, CA (US)

( * ) Notice: Subject to any disclaimer, the term of this patent is extended or adjusted under 35 U.S.C. 154(b) by 1707 days.

(21) Appl. No.: 11/226,949

(22) Filed: Sep. 15, 2005

(51) Int. Cl.
*G06F 9/46* (2006.01)
*G06F 12/00* (2006.01)

(52) U.S. Cl. ........ 718/102; 718/104; 710/200; 710/240; 711/147; 711/152; 707/999.01

(58) Field of Classification Search ...... 707/8; 711/145, 711/150, 151, 152, 155; 718/100
See application file for complete search history.

(56) References Cited

U.S. PATENT DOCUMENTS

| 6,182,177 | B1 | 1/2001 | Harriman | |
|---|---|---|---|---|
| 6,678,802 | B2* | 1/2004 | Hickson | 711/152 |
| 6,965,961 | B1* | 11/2005 | Scott | 710/310 |
| 7,130,905 | B2* | 10/2006 | Dinker et al. | 709/225 |
| 7,162,557 | B2* | 1/2007 | Takeda et al. | 710/240 |
| 2003/0131041 | A1* | 7/2003 | Dinker et al. | 709/104 |
| 2003/0200457 | A1* | 10/2003 | Auslander et al. | 713/200 |
| 2004/0098723 | A1* | 5/2004 | Radovic et al. | 718/104 |
| 2005/0080963 | A1* | 4/2005 | Schopp | 710/200 |

OTHER PUBLICATIONS

Tsigas, Philippas; Zhang, Yi. "Efficient Wait-Free Queue Algorithms for Real-Time Synchronization." Technical Report May 2002, Department of Computing Science, Chalmers University of Technology, 2002. Retrieved Sep. 3, 2010.*

Scherer, William N., III; Scott, Michael L. "Contention Management in Dynamic Software Transactional Memory." Proceedings of the ACM PODC Workshop on Concurrency and Synchronization in Java Programs. Jul. 2004.*

Radovic, Z. and Hagersten, E.; Hierarchical Backoff Locks for Non-uniform Communication Architectures. In Proceedings of the 9th International Symposium on high Performance Computer Architecture (Feb. 2003) 12 pages.

Scott, M.L. and Scherer III, W.N. Scalable Queue-Based Spin Locks with Timeout. Proceedings of the 8th Symposium on Principles and Practice of Parallel Programming 36, 7 (2001), 9 pages.

Lim, B.H., and Agarwal, A.; Reactive Synchronization Algorithms for Multiprocessors. In ASPLOS-VI: Proceedings of the sixth international conference on Architectural support for programming languages and operating systems (1994), 11 pages.

Magnusson, P.S., Oandin, A. and Hagersten, E.; Queue Locks on Cache Coherent Multiprocessors. In Proceedings of the 8th International Symposium on Parallel Processing (1994), 7 pages.

Craig, T.S.; Building FIFO and Priority-Queuing Spin Locks from Atomic Swap. Tech. Rep. TR 93-02-02, Department of Computer Science, University of Washington, Feb. 1993, 29 pages.

Mellor-Crummey, J.M., and Scott, M.L.; Algorithms for Scalable Synchronization on Shared-Memory Multiprocessors. ACM Transactions on Computer Systems 9, 1 (1991), 45 pages.

(Continued)

*Primary Examiner* — Jennifer N To
(74) *Attorney, Agent, or Firm* — Osha • Liang LLP

(57) ABSTRACT

A lock implementation has properties of both backoff locks and queue locks. Such a "composite" lock is abortable and is provided with a constant number of preallocated nodes. A thread requesting the lock selects one of the nodes, attempts to acquire the selected node, and, if successful, inserts the selected node in a wait-queue for the lock. Because there is only a constant number of nodes for the wait-queue, all requesting threads may not be queued. Requesting threads unable to successfully acquire a selected node may backoff and retry selecting and acquiring a node. A node at the front of the wait-queue holds the lock.

15 Claims, 6 Drawing Sheets

OTHER PUBLICATIONS

Graunke, G and Thakkar, S.; Synchronization Algorithms for Shared-Memory Multiprocessors. Computer 23, 6 (1990) 10 pages.

Anderson, T.E.; The Performance of Spin Lock Alternatives for Shared-Memory Multiprocessors. IEEE Transactions on Parallel and Distributed Systems 1, 1 (1990) 11 pages.

Scott, Michael L.; Non-Blocking Timeout in Scalable Queue-Based Spin Locks; Department of Computer Science; University of Rochester; New York; 2002; 10 pages.

BritishExpats.com, Dallas Walk-In: British Expat Discussion Forum, Jan. 7, 2002, http://britishexpats.com/forums/showthread.php?t=59651 (8 Pages).

\* cited by examiner

COMPOSITE ABORTABLE LOCKS

BACKGROUND

In computer system design, a "thread" is a sequence of instructions being executed by a processor. In many computer systems, multiple threads may be processed in parallel. Such "multithreading" may be supported in (i) a system having several processors (a "multiprocessor system"), each capable of processing one or more threads, or (ii) a system having a single processor (a "uniprocessor system") capable of processing multiple threads.

When designing a multithreaded system, it is important to implement mechanisms for handling situations in which two or more threads attempt to concurrently access a particular shared resource (e.g., a shared memory location). Such implementations often involve the use of "locks," which are constructs that may be used to protect particular shared resources. In such cases, a thread needing access to a shared resource must "acquire" or "obtain" the lock protecting the shared resource prior to being able to access the shared resource. If the lock is already acquired by another thread, the requesting thread will have to wait for the lock to be "released."

In some lock implementations, should a thread fail to acquire a particular lock, the thread may continue to repeat attempts to acquire that lock until the lock is acquired. In other lock implementations, a thread may specify a time period indicating how long the thread is willing to wait to acquire a particular lock. If the lock is not acquired within the specified time period, the thread returns to its owning process with an indication that the thread failed to acquire the lock. Certain types of such "abortable" locks may require that an aborting thread wait for action by at least one other thread on the lock. Other types of "abortable" locks are "non-blocking" in that they allow an aborting thread to leave without having to wait for action by another thread.

A relatively simple type of lock implementation that may be abortable involves a thread first attempting to atomically (i.e., in a single step) change a status of a lock from "free" to "owned" using, for example, a test-and-set operation. If the status of the lock is successfully changed, the thread has acquired the lock, thereby allowing the thread to access and modify the shared resource protected by the lock. If the status of the lock is not successfully changed, the thread may repeat the atomic operation; else, if the lock is abortable, the thread may cease attempts to acquire the lock after a specified period of time has elapsed.

Those skilled in the art will note that the test-and-set type lock discussed above has a constant space requirement with respect to how much space in memory is needed for operation of the lock. Particularly, such locks have a space requirement of O(L) for T threads using L locks (i.e., the space required for a particular number of locks is not dependent on the number of threads). Further, those skilled in the art will note that non-blocking aborts of such locks come at a relatively low cost.

In order to avoid adverse increases in memory traffic resulting from repeated atomic operations on the same shared resource, test-and-set type locks may be provided with "backoff." In these types of lock implementations, if a thread fails to acquire a particular lock, the thread may delay a subsequent attempt to acquire the lock for some time, thereby reducing contention for that lock. Those skilled in the art will note that such "backoff" locks may be implemented with exponential increases in the amount of time between successive failed attempts to acquire a lock.

Typical backoff locks, while simple and relatively effective in low-scale multiprocessor systems, are not well suited for high-scale multiprocessor systems (e.g., systems having hundreds of processors). Further, those skilled in the art will note that it is difficult to make a thread backoff just the right amount, and, as a result, handing a lock from one thread to another may take significantly longer than necessary, thereby decreasing throughput.

Further, those skilled in the art will note that typical backoff locks are not capable of imposing an ordering between threads attempting to acquire a particular lock. Thus, because a thread that has just released a particular lock has that lock cached, that thread may acquire that lock again without allowing other threads to acquire the lock. This results in thread "starvation" (i.e., when certain threads are unable to acquire a particular lock for long periods of time).

A certain type of lock implementation that overcomes at least some of the shortcomings associated with typical backoff locks involves the formation of a queue of threads waiting for a lock. In such "queue" locks, a thread "spins" (i.e., waits) on some data that is part of the lock implementation. A thread in a "wait-queue" may spin, for example, on (i) a node the thread has inserted into the wait-queue or (ii) a predecessor node in the wait-queue. As one thread in the wait-queue releases the lock, another thread proceeds to enter a "critical section" of code for accessing the shared resource protected by the lock. In such a manner, handing a lock from one thread to another may occur relatively quickly and with minimal or no contention for the lock.

Those skilled in the art will note that queue locks, while more scalable than typical backoff locks, are generally not abortable. Certain types of abortable queue locks, although not commonly implemented, have shown to require O(L*T) space for L locks and T threads (i.e., the space needed for a particular number of locks increases as the number of threads increases). Moreover, typical abortable queue locks generally require extra memory management for the nodes in the wait-queue.

SUMMARY

According to one aspect of one or more embodiments of the present invention, a method of performing multithreading operations comprises: a thread attempting to acquire a lock associated with a shared resource, where the attempting comprises (i) selecting a node for the thread from among a constant number of nodes preallocated for the lock, the constant number being independent of a number of threads requesting the lock, (ii) attempting to acquire the selected node, and (iii) aborting the attempting to acquire the lock dependent on a duration of the attempting; and acquiring the lock dependent on the attempting to acquire the selected node.

According to another aspect of one or more embodiments of the present invention, a computer system comprises: at least one processor capable of processing at least one of a plurality of threads executable in the computer system; a shared resource accessible to the plurality of threads; and a storage medium having instructions comprising instructions to (i) queue up to a predetermined number of at least two threads requesting a lock for the shared resource, the predetermined number being constant and independent of a number of threads requesting the lock, and (ii) provide the lock to one of the queued requesting threads dependent on a position of the one of the queued requesting threads in the queue.

According to another aspect of one or more embodiments of the present invention, a method of performing computer system operations comprises a thread attempting to acquire a lock, where the attempting comprises: selecting a node to insert in a wait-queue for the lock from among a constant number of at least two nodes preallocated for the lock, acquiring the selected node dependent on an availability of the selected node, inserting the selected node in the wait-queue dependent on the acquiring, aborting the attempting dependent on a duration of the attempting, and obtaining the lock dependent on a position of the selected node in the wait-queue.

Other aspects and advantages of the invention will be apparent from the following description and the appended claims.

DETAILED DESCRIPTION

Figure 1:
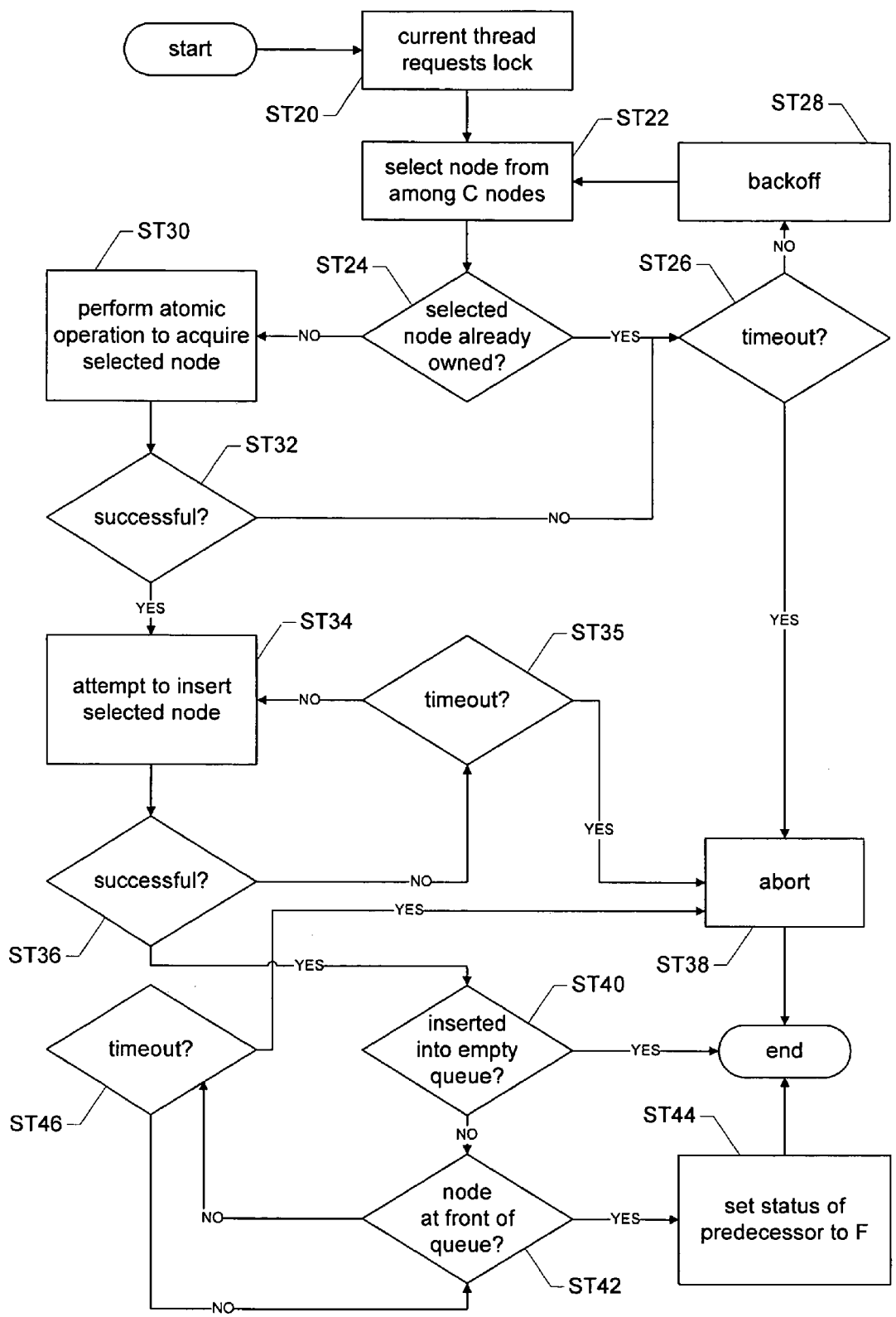
FIG. 1 shows a flow process in accordance with an embodiment of the present invention.

With a typical queue lock, each thread requesting the lock allocates and inserts a node in a first-in, first-out (FIFO) queue associated with the lock. Once having inserted a node in the wait-queue, a thread spins until a change in the wait-queue indicates that the thread can enter the critical section. Those skilled in the art will note that the allocation of one node for every thread requesting a particular lock results in increased space overhead and a need for potentially expensive memory management.

Embodiments of the present invention relate to a lock implementation that has a constant space requirement and supports an efficient ordering of C threads waiting for the lock. More particularly, a lock in accordance with one or more embodiments of the present invention has a fixed-size collection of nodes for queuing a particular number of threads waiting for the lock. Not all threads requesting the lock may be queued. Moreover, a lock implementation in accordance with one or more embodiments of the present invention is said to be "composite" in that it may have properties of both backoff locks and queue locks. Moreover, composite locks in accordance with one or more embodiments of the present invention may be non-blocking abortable locks.

In one or more embodiments of the present invention, a composite lock is provided with a constant number of nodes. In other words, while typical queue locks allocate a node for each thread requesting the lock, a composite lock in accordance with one or embodiments of the present invention has a fixed number of preallocated nodes, the fixed number being independent of the number of threads requesting the lock. Each of the nodes of a composite lock may be selected by a thread and inserted by that thread into a wait-queue for the lock. The thread then spins until entering the critical section or until after a specified time period has elapsed, in which case the thread aborts its attempt to acquire the composite lock.

As further described below, in one or more embodiments of the present invention, a composite lock has a collection of C nodes and a variable structure for referencing the tail node in a wait-queue for the lock. Each node preallocated for the composite lock may have one of at least four different states: F ("free"), R ("released"), W ("waiting"), and A ("aborted"). A node in state F is not owned by any thread and is acquirable by any thread. A node in state R is owned by a thread that released a composite lock. A node in state W is owned by a thread waiting for a composite lock. A node in state A is owned by a thread that aborted its attempt to acquire a composite lock. Those skilled in the art will note that nodes for a composite lock in accordance with one or more embodiments of the present invention may be in any one of a number of different states.

Moreover, in addition to having state information, each node may have a "next" pointer that may reference a predecessor node in a wait-queue for a composite lock. In one or more embodiments of the present invention, if the nodes for a composite lock are stored in an array, a next pointer in a node may be an array index referencing the location of its predecessor node in the array.

Further, in one or more embodiments of the present invention, the order of the nodes in a wait-queue for a composite lock may be represented explicitly by having each thread store the address of its predecessor node in its own node. In one or more other embodiments of the present invention, the order of the nodes in wait-queue for a composite lock may be represented implicitly by having each thread remember its predecessor node in a private variable.

FIG. 1 shows an exemplary flow process in accordance with an embodiment of the present invention. When a current thread requests access to a particular shared resource protected by a composite lock ST20, the current thread selects a node from among C nodes preallocated for the lock ST22, the C nodes being usable in a wait-queue for the lock. The number of preallocated nodes may depend on various factors including, but not limited to, architecture specifications, application behavior, and operating system requirements.

The selection of the node in ST22 may be based on one or more various techniques. For example, a thread may select a node completely randomly. In one or more other embodiments of the present invention, a thread may select a node systematically, e.g., based on how specific nodes are assigned to particular clusters of threads based on, for example, some system-specific heuristic. In one or more other embodiments of the present invention, a thread may select a node based on a combination of random and systematic approaches.

Once the current thread selects a node in ST22, a determination is made as to whether the selected node is already owned by another thread ST24. If the selected node is already owned by another thread ST24, the current thread may check to see if a time period specified to acquire the lock has elapsed ST26, in which case the current thread will abort its attempt to acquire the lock ST38. Otherwise, if the current thread has not "timed out" ST26, it may backoff ST28 and then retry selecting a node from among the C nodes ST22.

In one or more embodiments of the present invention, the amount of time between successive failed attempts to acquire a node may be increased exponentially. Further, as described above, in one or more embodiments of the present invention, a thread that selects an already owned node may not be limited to later reselecting the same node, but instead, may select from among all or a group of the nodes preallocated for the lock, thereby increasing the likelihood that the thread will select a node not already owned by another thread.

If the determination in ST24 indicates that the selected node is not already owned by another thread, the current thread attempts an atomic operation (e.g., a compare-and-swap (CAS) operation) to acquire the selected node ST30. If the atomic operation is not successful ST32, the current thread may check to see if a time period specified to acquire the lock has elapsed ST26, in which case the current thread aborts its attempt to acquire the lock ST38. Otherwise, if the current thread has not "timed out" ST26, it may backoff ST28 and then retry selecting a node from among the C nodes ST22.

Alternatively, if the atomic operation in ST32 is successful, the current thread attempts to insert the acquired node in a wait-queue for the lock ST34. If the insertion attempt is not successful ST36, the thread continuously retries for a successful insertion until "timed out" ST35, in which case the thread aborts its attempt to acquire the lock ST38. Otherwise, if and when the insertion attempt is successful ST36, a determination is made as to whether the node was inserted into an empty wait-queue ST40, in which case the current thread acquires the lock.

If the node was not inserted into an empty wait-queue. ST40, a determination is made as to whether the node is at the front of the wait-queue ST42, in which case the current thread subsequently sets the state of its predecessor node to F ST44 and acquires the lock. However, if the node was neither inserted into an empty wait-queue ST40 nor is at the front of the wait-queue ST42, this indicates that there are threads ahead of the current thread in the wait-queue. In this case, the current thread spins until it acquires the lock via ST42 or is "timed out" ST46. If "timed out" ST46, the current thread aborts its attempt to acquire the lock ST38.

Figure 2:
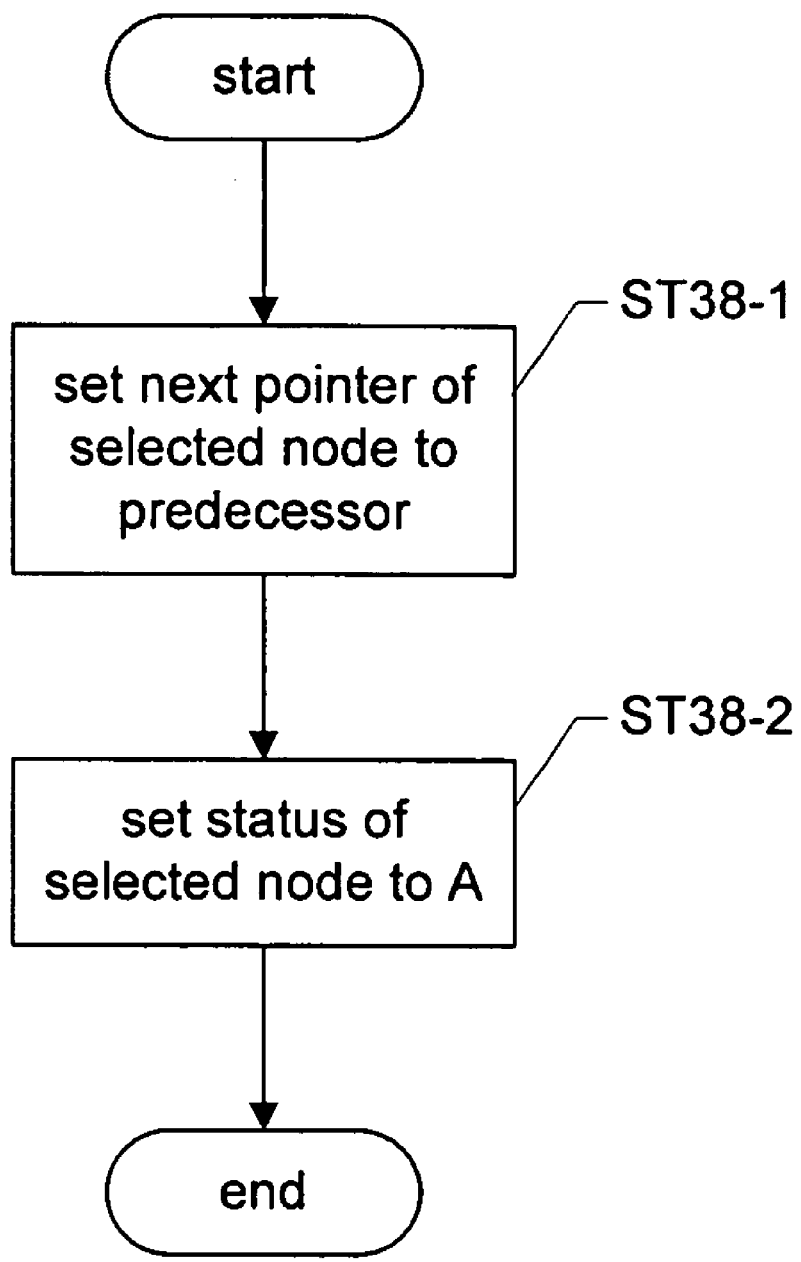
FIG. 2 shows a flow process in accordance with an embodiment of the present invention.

Still referring to FIG. 1, when a thread aborts its attempt to acquire a composite lock as a result of "timing out" in either ST26 or ST35, the thread can do so without having to interact with others threads/nodes because it did not successfully insert a node into a wait-queue for the lock. However, if the thread aborts its attempt to acquire the lock as a result of "timing out" in ST46, added consideration may be necessary because the thread has a node inserted in the wait-queue. Now referring to FIG. 2, in such a case, the thread (i) explicitly sets its node's next pointer to reference its predecessor node ST38-1 and (ii) sets the status of its node to A ST38-2.

Figure 3:
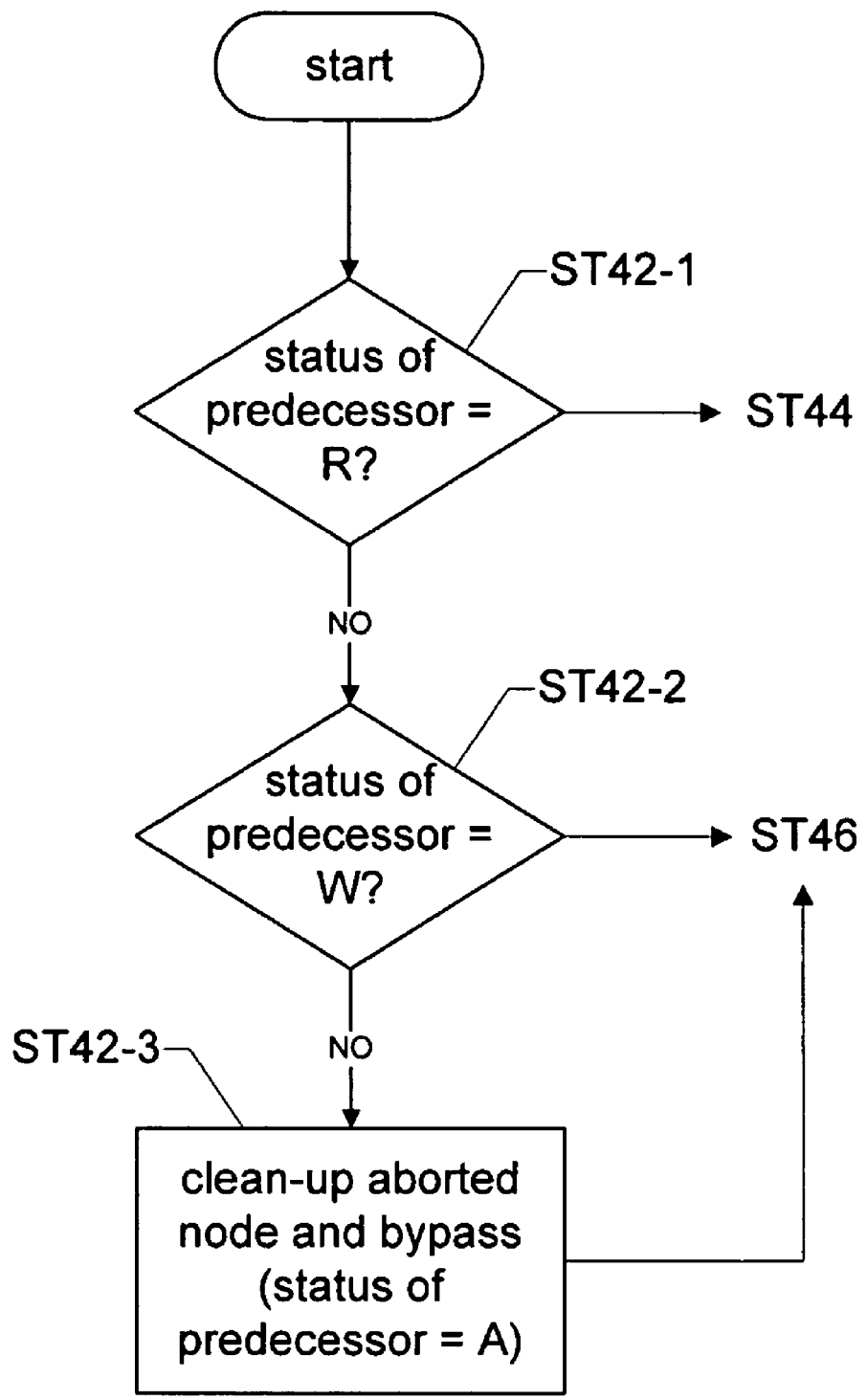
FIG. 3 shows a flow process in accordance with an embodiment of the present invention.

As described above with reference to FIG. 1, a current thread checks to see if its node is at the front of the wait-queue ST42. Now referring to FIG. 3, if the state of the current thread's predecessor node is R ST42-1, this indicates that the current thread is at the front of the wait-queue, in which case the current thread subsequently sets the state of its predecessor node to F (ST44, shown in FIG. 1).

If the state of the current thread's predecessor node is not R ST42-1 and is instead W ST42-2, this indicates that there is at least one thread ahead of the current thread that is waiting for the lock, in which case the thread continues to spin and checks for "timing out" (ST46, shown in FIG. 1).

If the state of the current thread's predecessor node is neither R ST42-1 nor W ST42-2, this necessarily indicates that the state of the current thread's predecessor node is A (nodes in the wait-queue cannot have state F). In this case, the current thread (i) "cleans up" and bypasses its predecessor node ST42-3 and (ii) continues to spin and checks for "timing out" (ST46, shown in FIG. 1).

Figure 4:
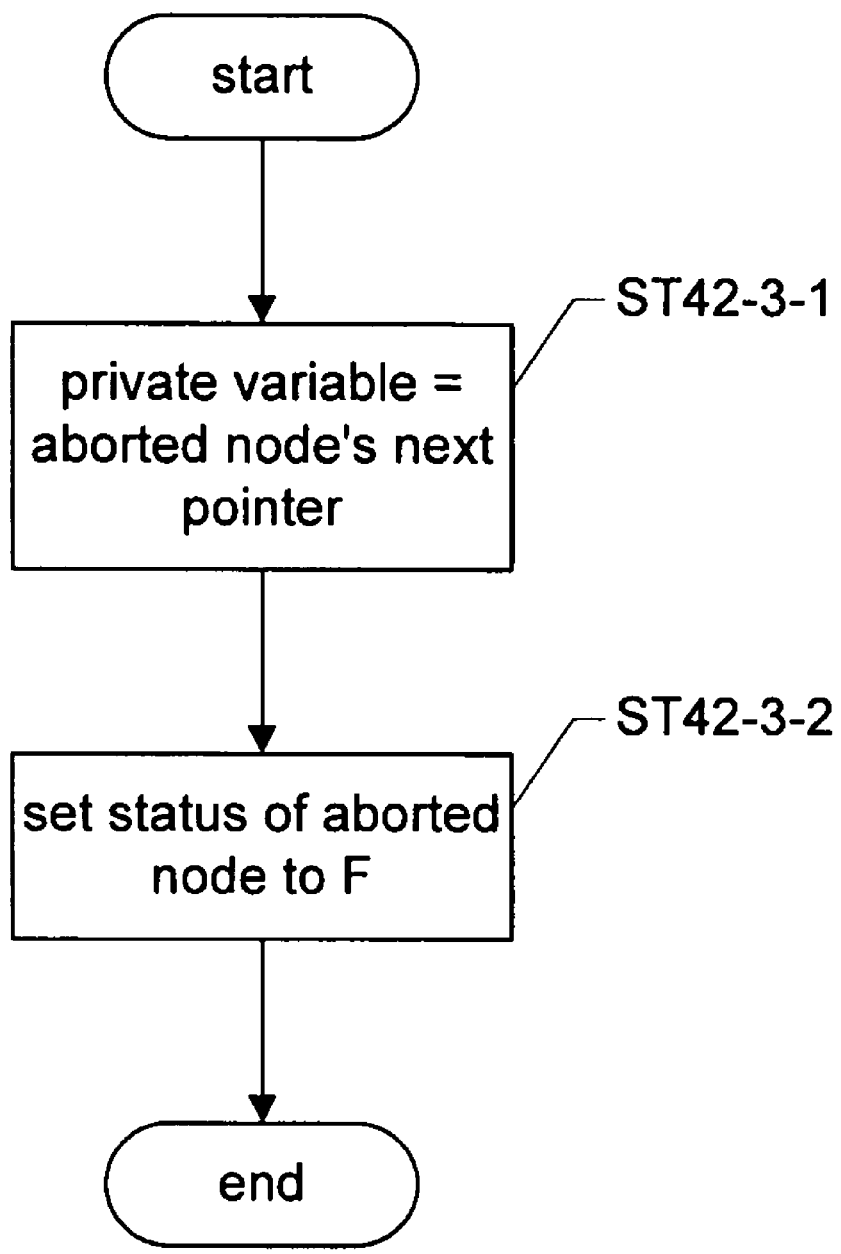
FIG. 4 shows a flow process in accordance with an embodiment of the present invention.

Now referring to FIG. 4, "cleaning up" a predecessor node having state A involves bypassing the aborted node by setting a particular private variable of the current thread's node to the next pointer of the aborted predecessor node ST42-3-1. In other words, the current thread makes its node point to the node pointed to by the aborted node. Then, the current thread sets the state of the aborted node to F ST42-3-2, thereby freeing that node for subsequent reuse.

In one or more embodiments of the present invention, it is possible for a composite lock's tail variable to point to a node that is in either state A or R. If the tail variable points to a released node, this indicates that the wait-queue for the lock is empty. If the tail variable points to an aborted node, then the wait-queue is not empty; however, there is no node in the wait-queue that has the aborted node as its predecessor node, and thus, there is no node in the wait-queue to set the state of the aborted node to F as described above with reference to FIG. 4.

In such cases (i.e., when the tail variable points to an aborted or released node), a thread attempting to acquire a node may (i) acquire the node pointed to by the tail variable and (ii) adjust the tail variable so that the acquired node may be subsequently inserted into the wait-queue. This may be achieved by, for example, performing an atomic operation to move the tail variable from pointing to the aborted or released node in order to acquire the node and then subsequently insert the acquired node into the wait-queue. The adjustment of the tail variable depends on the previous state of the acquired node. If the acquired node was previously released, this indicates the wait-queue is empty, and thus, the tail variable should point to NULL. Alternatively, if the acquired node was previously aborted, the tail variable is adjusted to point to the predecessor node of the aborted node.

As described above, in one or more embodiments of the present invention, a thread may clean up a composite lock's tail variable (e.g., setting it to NULL) and then change the tail variable again to insert its node into a wait-queue for the lock in the case that the lock was released prior to arrival of the thread. Further, those skilled in the art will note that there exist a variety of ways to optimize this feature. For example, in one or more embodiments of the present invention, a thread may be allowed to acquire an unheld composite lock by simply modifying the lock's tail variable to include an indication that the lock is held by a thread that has not inserted a node into the wait-queue.

Figure 5:
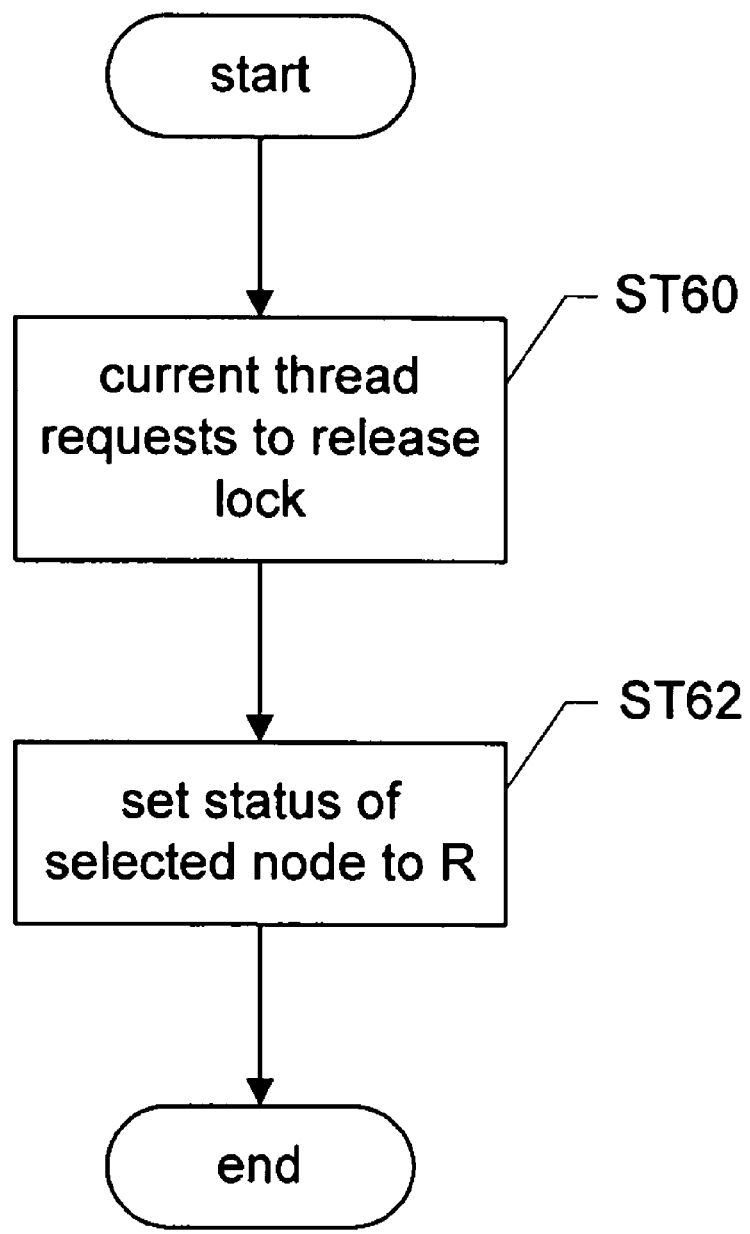
FIG. 5 shows a flow process in accordance with an embodiment of the present invention.

Now referring to FIG. 5, in one or more embodiments of the present invention, when a thread completes its use of a composite lock, the thread requests to release the lock ST60, in which case the state of its node is set to R ST62. As described above with reference to FIGS. 1 and 3, a node having state R is set to state F by another thread.

The exemplary pseudocode below details an implementation and use of a composite lock in accordance with one or more embodiments of the present invention. The composite lock has a variable tail structure (line 3) and a fixed-size array of C nodes (line 4). Each node has (i) a state field (line 8) and (ii) a pointer for referencing the next node in a wait-queue for the composite lock (line 9). The tail structure has (i) a pointer to a tail node of the wait-queue (line 13) and (ii) a version number (line 14).

```
1: // Datatypes
2: typedef struct {
3:   TailNode Tail; // lock has a TailNode structure
4:   QNode buffer[C]; // lock has an array of C QNodes
5: } Lock;
6:
7: typedef struct {
8:   unsigned int state; // free (F), waiting (W), released (R), or aborted (A)
9:   QNode *next; // pointer to next QNode
10: } QNode;
11:
12: typedef struct {
13:   QNode *pNode; // pointer to tail node
14:   unsigned int version; // version number
15: } TailNode
16:
```

```
17: // Functions
18: // initialize Tail to point to Null
19: // initialize each QNode state to F
20: QNode* acquire(Lock *L, unsigned long patience)
21: unsigned long start_time=CurrentNanoTime( );
22: int nano_backoff=INIT_BACKOFF;
23: unsigned int tail_version;
24: int index=ChooseRandomInt(0, C-1); // random num-
    ber to index array
25: QNode *acq_node=&L→buffer[index]; // select node
26: QNode *implicitnext=NULL;
27: TailNode currTail;
28: while (TRUE) {
29: if(CAS(&acq_node→state, F, W)) // attempt to acquire
    selected node
30: break;
31: currTail=L→Tail;
32: int node_state=acq_node→state;
33: if((node_state==A)||(node_state==R)) }
34: if(acq_node==currTail.pNode) {
35: QNode *next_node=NULL;
36: if(node_state==A)
37: next_node=acq_node→next;
38: if(CAS(&L→Tail, currTail,<next_node, currTail.ver-
    sion+1>)) {
39: acq_node→state=W;
40: break;
41: }
42: }
43: }
44: backoff(ChooseRandomInt(0,nano_backoff));
45: nano_backoff<<=1;
46: if((CurrentNanoTime( )−start_time)>patience)
47: return NULL;
48: }
49: do {
50: currTail=L→Tail;
51: } while(!CAS(&L→Tail,currTail,<acq_node,currTail-
    .version+1>));
52: QNode *implicit_next=currTail.pNode;
53: if(implicit_next==NULL)
54: return acq_node;
55: int next_state=implicit_next→state;
56: while(next_state !=R) {
57: if(next_state==A) {
58: QNode *tmp=implicit_next;
59: implicit_next=implicit_next→next;
60: tmp→state=F;
61: }
62: if((CurrentNanoTime( )−start_time)>patience) {
63: acq_node→next=implicit_next;
64: acq_node→state=A;
65: return NULL;
66: }
67: next_state=implicit_next→state;
68: }
69: implicit_next→state=F;
70: return acq_node;
71:
72: void release(Lock *L, QNode* acq_node)
73: acq_node→state=R;
```

During initialization of the composite lock, (i) the tail structure pointer may be set to NULL to indicate that the wait-queue is initially empty (line 18), and (ii) the state of each node in the fixed-size array may be set to F (line 19).

A thread requesting the composite lock must first select a node in the fixed-size array. This may be achieved by randomly selecting a number to index a particular node in the fixed-size array (lines 24-25). The thread then attempts to acquire the selected node by performing an atomic operation (e.g., a CAS operation) on the selected node, the atomic operation being successful if the selected node is in state F, whereupon the state of the selected node is changed to W (line 29). If the selected node is not in state F, the thread retries selecting and acquiring a node with exponential backoff between failed attempts (line 44), the retrying ceasing if a period specified for the thread to acquire a node elapses (lines 46-47).

Once a thread successfully acquires a node (the acquire node thus having state W), the thread attempts to atomically insert the acquired node at an end of the wait-queue (lines 49-51). If the inserted node is the first node in the wait-queue, the thread has successfully acquired the composite lock (lines 53-54). If the inserted node is not the first node in the wait-queue, the thread spins on the next node in the wait-queue until the state of the next node switches to R (lines 56-68). When the state of the next node switches to R, the thread sets the state of the next node to F (line 69), thereby freeing the next node for subsequent reuse. After executing its critical section, the thread releases the composite lock by updating the status of its node to R (line 73), which effectively allows the next thread (if any) in the wait-queue to acquire the composite lock.

As described above with reference to FIG. 1, a thread seeking a composite lock may abort if a period specified for the thread to acquire the composite lock elapses. During backoff (i.e., the thread has not yet successfully acquired a node), the thread may abort without having to inform other threads because the thread has not yet entered the wait-queue (lines 46-47). If the thread decided to abort when already in the wait-queue, (i) the thread makes the next node in the wait-queue explicit (line 63) and (ii) the thread then sets its node state to A (line 64), thereby effectively aborting the thread's attempt to acquire the composite lock. In this case, the thread, if any, that owns the node immediately behind the recently-aborted thread is responsible for cleaning up that aborted node (lines 57-61). The immediately-behind thread achieves this by (i) changing its next pointer to the next pointer of the aborted node (line 59) and (ii) setting the state of the aborted node to F (line 60), thereby freeing the aborted node for subsequent reuse.

As described above, a thread intending to acquire a node that is in either state A or state R must wait for another thread to set the state of the node to F. However, if there is no node behind the node in state A or state R (i.e., the node in state A or state R is the tail node of the wait-queue), there is no thread to set the state of the node to F. In this case, a thread intending to acquire a node may acquire the tail node itself. This involves (i) atomically acquiring the tail node (line 38) and (ii) setting the state of the acquired node to W (line 39).

In the case of acquiring the tail node (lines 38-39), the value of the pointer in the composite lock's tail structure depends on the previous state of the tail node. If the state of the acquired node was R, then the wait-queue was empty. In this case, the tail structure pointer is set to NULL. The next thread that inserts a node into the wait-queue (possibly the same thread that set the tail structure pointer to NULL) implicitly acquires the lock as there is no predecessor node in the wait-queue (lines 52-54).

If the state of the tail node acquired in lines 38-39 was A, this necessarily implies that there is at least one node ahead of the now-acquired tail node because a node at the head of the wait-queue must either be in state W or R. In this case, the tail structure pointer is set to the predecessor node of the now-acquired tail node (lines 36-37).

Those skilled in the art will note that a composite lock in accordance with one or more embodiments of the present invention may be implemented using a queuing approach different from that described above. For example, in one or more embodiments of the present invention, a composite lock may be implemented based on a known queuing approach such as that used in the Mellor-Crummey and Scott queue lock.

Figure 6:
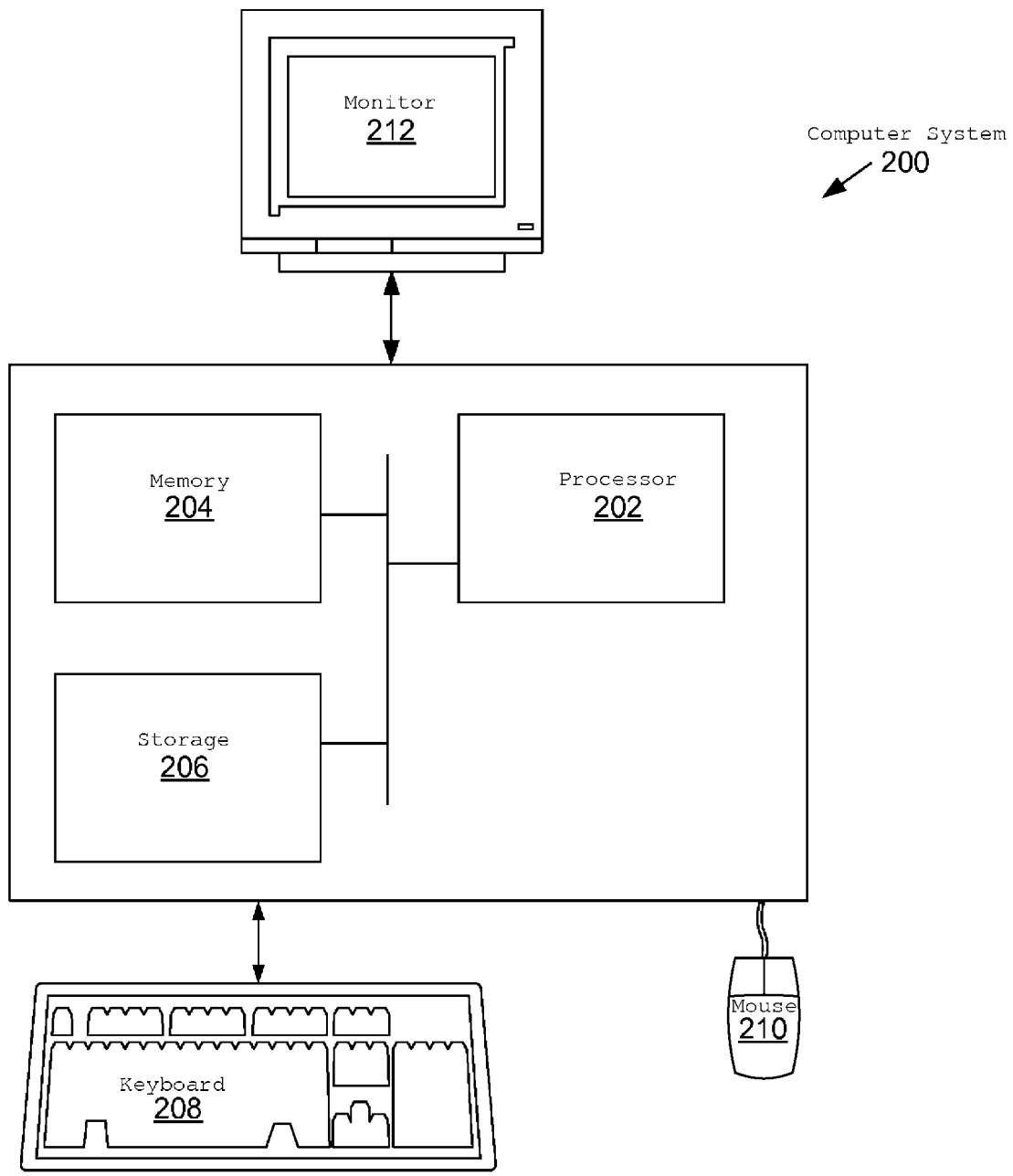
FIG. 6 shows a computer system in accordance with an embodiment of the present invention.

An embodiment of the present invention may be associated with virtually any type of computer system, including multiprocessor and multithreaded uniprocessor systems, regardless of the platform being used. For example, as shown in FIG. 6, a networked computer system 200 includes at least one processor 202, associated memory 204, a storage device 206, and numerous other elements (not shown) and functionalities typical of modern computer systems. The networked computer system 200 may also include input means, such as a keyboard 208 and a mouse 210, and output means, such as a monitor 212. The networked computer system 200 is connected to a local area network (LAN) or a wide area network via a network interface connection (not shown). Those skilled in the art will appreciate that these input and output means may take other forms. Further, those skilled in the art will appreciate that one or more elements of the networked computer system 200 may be remotely located and connected to the other elements over a network. Further, software instructions to perform embodiments of the invention may be stored on a computer readable medium such as a compact disc (CD), a diskette, a tape, a file, a hard drive, or any other computer-readable storage device.

Advantages of the present invention may include one or more of the following. In one or more embodiments of the present invention, for L locks and T threads, composite locks may only require $O(L)$ space in the worst case as compared with $O(L*T)$ space required in the worst case for typical abortable queue locks.

In one or more embodiments of the present invention, like typical backoff locks, composite locks may support low-cost non-blocking aborts.

In one or more embodiments of the present invention, like typical queue locks, a composite lock may achieve high throughput under high load because they hand the lock from a releasing thread to the next waiting thread relatively quickly.

In one or more embodiments of the present invention, aborting a thread after acquiring a node is relatively simpler with a composite lock than with typical abortable queue locks. This is due to the use of a fixed number of nodes in the queue, whereby an aborting thread does not need to interact with mechanisms of expensive and/or costly memory management techniques attendant with typical abortable queue locks.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for acquiring a lock associated with a shared resource, comprising:
   selecting, by a thread, a first node from a plurality of nodes preallocated for the lock, wherein the lock is configured to protect the shared resource such that the thread is required to acquire the lock prior to being able to access the shared resource, and wherein the plurality of nodes is constant and independent of a number of threads requesting the lock;
   making a first node acquisition attempt, by the thread, to acquire the first node;
   making a first node insertion attempt, by the thread, to insert the first node into a wait queue associated with the lock, upon success of the first node acquisition attempt;
   acquiring the lock, by the thread, based on a position of the first node in the wait queue, upon success of the first node insertion attempt;
   determining, by the thread, whether a first time period specified for the thread to acquire the lock has elapsed, upon failure of the first node acquisition attempt;
   when the first time period has elapsed:
      aborting, by the thread, any further attempts to acquire one of the plurality of nodes for the lock;
   when the first time period has not elapsed:
      waiting, by the thread, for a second time period;
   when the first time period has not elapsed and the second time period has elapsed:
      selecting, by the thread, a second node from the plurality of nodes for the lock; and
      making, by the thread, a second node acquisition attempt to acquire the second node.

2. The method of claim 1, wherein the first node acquisition attempt comprises:
   performing an atomic operation, by the thread, on the first node.

3. The method of claim 1, wherein the shared resource comprises at least one memory location.

4. The method of claim 1, further comprising:
   releasing the lock by the thread; and
   freeing the first node by the thread, wherein upon the releasing the first node is available for selecting and acquiring by another thread.

5. The method of claim 1, wherein the first node acquisition attempt comprises:
   determining, by the thread, whether the first node is a last node in the wait queue for the lock and has one of an aborted state and a released state; and
   acquiring the first node by the thread dependent on the determining.

6. The method of claim 1, further comprising:
   determining, by the thread, whether the first time period specified for the thread to acquire the lock has elapsed, upon failure of the second node acquisition attempt;
   when the first time period has not elapsed:
      waiting, by the thread, for a third time period, wherein the third time period is greater than the second time period;
   when the first time period has not elapsed and the third time period has elapsed:
      selecting, by the thread, a third node from the plurality of nodes for the lock; and making, by the thread, a third node acquisition attempt to acquire the third node.

7. The method of claim 1, further comprising:
   determining, by the thread, whether a first time period specified for the thread to acquire the lock has elapsed, upon failure of the first node insertion attempt;
   when the first time period has elapsed:
      aborting, by the thread, any further attempt to insert the first node into the wait queue; and
   when the first time period has not elapsed:
      making a second attempt, by the thread, to insert the first node into the wait queue.

8. A system for providing concurrent access to a shared resource in a multi-threaded execution environment, comprising:
    processor for executing instructions stored on a computer readable storage medium;
    the shared resource; and
    the computer readable storage medium, comprising:
        instructions for implementing a lock to protect the shared resource such that each one of a plurality of threads executing in the multi-threaded execution environment is required to acquire the lock prior to accessing the shared resource, comprising functionality to:
            allocate a plurality of nodes for the lock, wherein the plurality of nodes is constant and independent of the plurality of threads requesting the lock, and instantiate a wait queue for the lock;
        instructions for implementing each one of the plurality of threads, comprising functionality to:
            select a first node from the plurality of nodes for the lock;
            make a first node acquisition attempt to acquire the first node;
            make a first node insertion attempt to insert the first node into the wait queue, upon success of the first node acquisition attempt;
            acquire the lock based on a position of the first node in the wait queue, upon success of the first node insertion attempt;
            determine whether a first time period specified for each one of the plurality of threads to acquire the lock has elapsed, upon failure of the first node acquisition attempt;
            when the first time period has elapsed:
                abort any further attempts to acquire one of the plurality of nodes for the lock
            when the first time period has not elapsed:
                wait for a second time period;
            when the first time period has not elapsed and the second time period has elapsed:
                select a second node from the plurality of nodes for the lock; and
                make a second node acquisition attempt to acquire the second node.

9. The system of claim 8, wherein the instructions for implementing each one of the plurality of threads further comprise functionality to:
    determine whether the first time period specified for each one of the plurality of threads to acquire the lock has elapsed, upon failure of the second node acquisition attempt;
    when the first time period has not elapsed:
        wait for a third time period, wherein the third time period is greater than the second time period;
    when the first time period has not elapsed and the third time period has elapsed:
        select a third node from the plurality of nodes for the lock; and
    make a third node acquisition attempt to acquire the third node.

10. The system of claim 8, wherein the instructions for implementing each one of the plurality of threads further comprise functionality to:
    release the lock;
free the first node, wherein upon the releasing of the lock the first node is eligible for acquisition by one of the plurality of threads.

11. The system of claim 8, wherein the instructions for implementing each one of the plurality of threads further comprise functionality to:
    determine whether the first time period specified for each one of the plurality of threads to acquire the lock has elapsed, upon failure of the first node insertion attempt;
    when the first time period has elapsed:
        abort any further node insertion attempts;
        free the first node; and
    when the first time period has not elapsed:
make a second node insertion attempt to insert the first node into the wait queue.

12. A non-transitory computer readable storage medium comprising instructions for acquiring a lock associated with a shared resource, the instructions comprising functionality to:
    select a first node from a plurality of preallocated nodes for the lock, wherein the lock is configured to protect the shared resource such that acquisition of the lock is required prior to being able to access the shared resource, and wherein the plurality of preallocated nodes is constant and independent of a plurality of threads requesting the lock;
    make a first node acquisition attempt to acquire the first node;
    make a first node insertion attempt to insert the first node into a wait queue associated with the lock, upon success of the first node acquisition attempt; acquire the lock based on a position of the first node in the wait queue, upon success of the first node insertion attempt;
    determine whether a first time period specified to acquire the lock has elapsed, upon failure of the first node acquisition attempt;
    when the first time period has elapsed:
        abort any further attempts to acquire one of the plurality of preallocated nodes for the lock
    when the first time period has not elapsed:
        wait for a second time period;
    when the first time period has not elapsed and the second time period has elapsed:
        select a second node from the plurality of preallocated nodes for the lock; and
    make a second node acquisition attempt to acquire the second node.

13. The non-transitory computer readable storage medium of claim 12, the instructions further comprising functionality to:
    determine whether the first time period specified to acquire the lock has elapsed, upon failure of the second node acquisition attempt;
    when the first time period has not elapsed:
        wait for a third time period, wherein the third time period is greater than the second time period;
    when the first time period has not elapsed and the third time period has elapsed:

select a third node from the plurality of nodes preallocated for the lock; and make a third node acquisition attempt to acquire the third node.

14. The non-transitory computer readable storage medium of claim 12, the instructions further comprising functionality to:

release the lock; and free the first node, wherein, upon the releasing of the lock, the first node is eligible for acquisition by one of the plurality of threads.

15. The non-transitory computer readable storage medium of claim 12, the instructions further comprising functionality to:

determine whether a first time period specified to acquire the lock has elapsed, upon failure of the first node insertion attempt;

when the first time period has elapsed:
abort any further node insertion attempts;
free the first node; and when the first time period has not elapsed:
make a second node insertion attempt to insert the first node into the wait queue.

* * * * *